(12) United States Patent
Pelley

(10) Patent No.: US 8,476,962 B2
(45) Date of Patent: *Jul. 2, 2013

(54) SYSTEM HAVING MULTIPLE VOLTAGE TIERS AND METHOD THEREFOR

(75) Inventor: Perry H. Pelley, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/621,005

(22) Filed: Nov. 18, 2009

(65) Prior Publication Data

US 2011/0115554 A1    May 19, 2011

(51) Int. Cl.
*G05F 1/10* (2006.01)

(52) U.S. Cl.
USPC ................. 327/536; 363/60; 327/540

(58) Field of Classification Search
USPC ................. 327/540, 536; 363/59–60
See application file for complete search history.

(56) References Cited

U.S. PATENT DOCUMENTS

| | | | |
|---|---|---|---|
| 4,013,901 A | | 3/1977 | Williams |
| 5,414,614 A | * | 5/1995 | Fette et al. ............... 363/59 |
| 5,638,013 A | * | 6/1997 | Iwata et al. ............. 327/126 |
| 5,867,040 A | * | 2/1999 | Fuse et al. ............... 326/101 |
| 6,034,562 A | | 3/2000 | Bonet et al. |
| 6,479,974 B2 | * | 11/2002 | Cohn et al. .............. 323/312 |
| 6,509,725 B1 | * | 1/2003 | Bernstein et al. .......... 323/312 |
| 6,552,581 B1 | | 4/2003 | Gabara |
| 7,071,765 B2 | * | 7/2006 | Kamijo ..................... 327/536 |
| 7,282,954 B2 | | 10/2007 | Quinn |
| 7,329,968 B2 | * | 2/2008 | Shepard et al. ............. 307/18 |
| 7,489,185 B2 | * | 2/2009 | Lee ........................... 327/540 |
| 7,679,216 B2 | * | 3/2010 | Grewing et al. ............ 307/63 |
| 7,710,192 B2 | * | 5/2010 | Kaeslin et al. ............. 327/535 |
| 7,764,563 B2 | * | 7/2010 | Tanzawa et al. ........... 365/226 |
| 2002/0190692 A1 | * | 12/2002 | Marten ....................... 320/116 |
| 2006/0119390 A1 | * | 6/2006 | Sutardja ...................... 326/62 |
| 2008/0246341 A1 | | 10/2008 | Pelley et al. |
| 2008/0297133 A1 | | 12/2008 | Duan et al. |
| 2009/0212841 A1 | | 8/2009 | Chu et al. |
| 2010/0259299 A1 | * | 10/2010 | Dennard et al. ............ 326/80 |

OTHER PUBLICATIONS

U.S. Appl. No. 12/621,026 office action—rejection—mailed Aug. 18, 2011.

* cited by examiner

*Primary Examiner* — Thomas J Hiltunen
(74) *Attorney, Agent, or Firm* — Daniel D. Hill; James L. Clingan, Jr.

(57) ABSTRACT

A system includes a first circuit, a first charge pump, a second circuit, and a second charge pump. The first circuit has a first power supply terminal coupled to a positive power supply terminal and a second power supply terminal. The first charge pump has an input coupled to positive power supply terminal and an output coupled to the second power supply terminal of the first circuit. The second circuit has a first power supply terminal coupled the second power supply terminal of the first circuit and a second power supply terminal. The second charge pump has an input coupled to the first power supply terminal of the second circuit and an output coupled to the second power supply terminal of the second circuit.

13 Claims, 3 Drawing Sheets

SYSTEM HAVING MULTIPLE VOLTAGE TIERS AND METHOD THEREFOR

CROSS-REFERENCE TO RELATED APPLICATION

This application is related to a co-pending application having Ser. No. 12/621,026, by Perry Pelley, entitled "System and Method for Communicating Between Multiple Voltage Tiers", and filed concurrently herewith.

BACKGROUND

1. Field

This disclosure relates generally to electronic circuits, and more specifically, to a system having multiple voltage tiers and method therefor.

2. Related Art

Reducing power consumption in integrated circuits has become a high priority. One way power is saved in logic circuits is to use multiple voltage tiers to "stack" logic elements between power supply voltage rails. This allows a current used to perform one logic operation to be reused, or recycled, to perform additional logic operations. However, as transistor sizes are reduced, requiring lower power supply voltages, system noise becomes a larger percentage of the power supply voltage. In this case, the use of multiple voltage tiers becomes even more difficult. Also, it may be necessary for circuits of the multiple voltage tiers to be able to communicate with each other. One or more level shifters can be used to level shift a signal from one voltage tier to another, however, a level shifter can generally only translate between adjacent voltage tiers, requiring the use of multiple level shifters when there are more than two voltage tiers.

Therefore, what is needed is a system that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
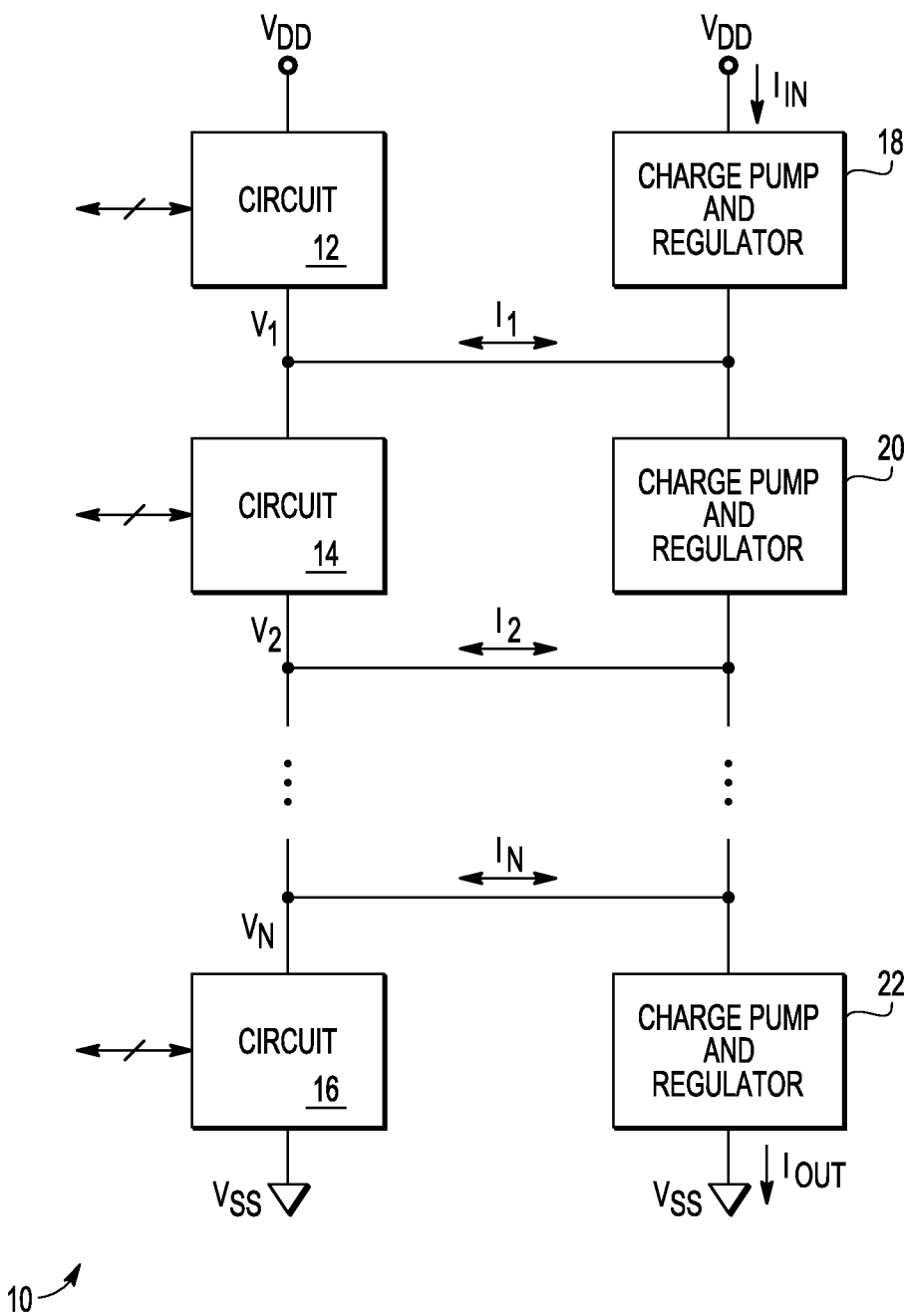
FIG. 1 illustrates, in block diagram form, a system in accordance with an embodiment.

Generally, there is provided, a plurality of circuits, where each of the plurality of circuits receives a power supply voltage that is a predetermined fraction of a rail-to-rail power supply voltage. A charge pump and regulator circuit is coupled to each of the power supply terminals of each of the plurality of circuits. The charge pump and regulator circuit sinks or sources current at the power supply terminals of one of the plurality of circuits to balance the amount of current provided through the circuit. Balancing the current provides for less power consumption while also providing for more reliable operation. Also, the use of multiple voltage tiers provides the benefits of a very low power supply voltage while allowing the integrated circuit to be powered using a more easily usable, customer friendly, power supply voltage.

Also, there is provided, a circuit for allowing communication between circuits of multiple voltage tiers. The circuit includes a plurality of capacitors coupled together in series, where a capacitor of the series is coupled between the outputs of input/output circuits corresponding to each of the plurality of circuits. The series of capacitors are first precharged to a predetermined voltage. Then, when one of the I/O circuits provides a data bit to the series of capacitors, the data bit causes the voltage stored on each capacitor to increase or decrease by the same amount, thereby translating the data bit to each of the different voltage tiers simultaneously. By translating the data bit using the series of capacitors, level shifters are not required. Also, translating using the series of capacitors is much faster than traditional level shifters because a traditional level shifter generally can only level shift between adjacent voltage tiers. To level shift a signal between multiple voltage tiers requires a level shifter between each tier and the level shifting between tiers must be done serially.

The integrated circuit may comprise a semiconductor substrate formed from any semiconductor material or combinations of materials, such as gallium arsenide, silicon germanium, silicon-on-insulator (SOI), silicon, monocrystalline silicon, the like, and combinations of the above.

In one aspect, there is provided, a system, comprising: a first circuit having a first power supply terminal coupled to a positive power supply terminal and a second power supply terminal; a first charge pump having an input coupled to positive power supply terminal and an output coupled to the second power supply terminal of the first circuit; a second circuit having a first power supply terminal coupled the second power supply terminal of the first circuit and a second power supply terminal; and a second charge pump having an input coupled to the first power supply terminal of the second circuit and an output coupled to the second power supply terminal of the second circuit. The first circuit may function as core and the second circuit may function as a core. The first charge pump may supply current to the second circuit if current supplied by the first circuit at the second power supply node of the first circuit is less than a minimum current requirement of the second circuit. The second charge pump may pass current from the first power supply terminal of the second circuit to the second supply terminal of the second circuit if the current supplied by the first circuit to the second power supply terminal of the first circuit exceeds a maximum current requirement of the second circuit. The first charge pump may determine if the minimum current requirement is met by detecting a voltage on the second power supply terminal of the first circuit. The second charge pump may determine if the maximum current requirement is met by detecting the voltage on the second power supply terminal of the first circuit. The system may further comprise: a third circuit having a first power supply terminal coupled to the second power supply terminal of the second circuit and a second power supply terminal; and a third charge pump having an input coupled to the first power supply terminal of the third circuit and an output coupled to the second power supply terminal of the third circuit. The second charge pump may supply current to the third circuit if current supplied by the second circuit at the second power supply node of the second circuit is less than a minimum current requirement of the third circuit. The third charge pump may pass current from the first power supply terminal of the third circuit to the second supply terminal of the third circuit if the current supplied by the second circuit to the second power supply terminal of the second circuit exceeds a maximum current requirement of the third circuit.

The first charge pump and the second charge pump may function to provide a required current to the second current and divert excess current from the first circuit away from the second circuit.

In another aspect, there is provided, a method of operating a system having a first a first circuit having a first power supply terminal coupled to a positive power supply terminal and a second power supply terminal and a second circuit having a first power supply terminal coupled the second power supply terminal of the first circuit and a second power supply terminal, comprising: operating the first circuit to cause a first current to pass from the first terminal of the first circuit to the second terminal of the first circuit; determining if the first current exceeds the a maximum current requirement of the second circuit or if the first current is less than a minimum current requirement of the second circuit; if the first current exceeds the maximum current requirement of the second circuit, diverting a sufficient portion of the first current away from the second circuit so that a remaining portion of the first current does not exceed the maximum current requirement of the second circuit; and if the first current is less than the minimum current requirement of the second circuit, providing an additional current to the first current so that a sum of the first current and the additional current is not less than the minimum current requirement of the second circuit. The step of determining may comprise detecting a voltage at the second power supply terminal of the first circuit. The step of providing may be performed using a charge pump coupled between the first and second power supply terminals of the first circuit. The step of diverting may be performed using a charge pump coupled between the first and second power supply terminals of the second circuit. The system may further include a third circuit having a first power supply terminal coupled to the second power supply terminal of the second circuit and a second power supply terminal; the method further comprising: passing a second current through the second circuit that does not exceed the maximum current requirement of the second circuit and is not less than the minimum current requirement of the second circuit; determining if the second current exceeds a maximum current requirement of the third circuit or if the second current is less than a minimum current requirement of the third circuit; if the second current exceeds the maximum current requirement of the third circuit, diverting a sufficient portion of the second current away from the third circuit so that a remaining portion of the second current does not exceed the maximum current requirement of the third circuit; and if the second current is less than the minimum current requirement of the third circuit, providing a further current to the second current so that a sum of the second current and the further current is not less than the minimum current requirement of the third circuit. The step of providing a further current and the step of diverting a portion of the first current may be performed by a charge pump coupled between the first and second power supply terminals of the second circuit. The step of diverting a sufficient portion of the second current may be performed using a charge pump coupled between the first and second power supply terminals of the third circuit.

In yet another aspect, there is provided, a system comprising: a plurality of circuits having serially connected power supply terminals coupled between a positive power supply terminal and a negative power supply terminal; a plurality of charge pumps serially connected inputs and outputs coupled to the power supply terminals of the plurality of circuits; wherein each circuit of the plurality of circuits has a first power supply terminal and a second power supply terminal; and each charge pump of the plurality of charge pumps corresponds to a circuit of the plurality of circuits and has its input coupled to the first power supply terminal of the circuit to which it corresponds and an output coupled to the second power supply terminal of the circuit to which it corresponds. Each charge pump may divert current away from the circuit to which it corresponds if the current present on its input exceeds a maximum current requirement of the circuit to which it corresponds. Each charge pump may provide additional current to a circuit of the plurality of circuits to which its output is coupled if the current received by the first power supply terminal of the circuit to which its output is coupled is less than a minimum current requirement of the circuit to which its output is coupled.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in block diagram form, a system 10 in accordance with an embodiment. System 10 includes a plurality of circuits such as circuits 12, 14, and 16. Circuits 12, 14, and 16 can include any type of circuit, such as a data processing core, a digital signal processing (DSP) application, a memory, or the like. For example, circuits 12, 14, and 16 can be digital logic circuits, analog circuits, or a combination of digital and analog circuits. System 10 also includes a plurality of charge pump and regulator circuits, such as charge pump and regulator circuits 18, 20, and 22. The charge pump can be any kind of charge pump and the regulator can be any kind of voltage regulator. Circuit 12 has a first power supply voltage terminal for receiving a power supply voltage labeled "VDD", a second power supply voltage terminal for receiving a power supply voltage labeled "V1", and a plurality of bidirectional terminals for coupling circuit 12 to another circuit (not shown), if necessary. Circuit 14 has a first power supply voltage terminal for receiving a power supply voltage labeled "V1", a second power supply voltage terminal for receiving a power supply voltage labeled "V2", and a plurality of bidirectional terminals for coupling circuit 14 to another circuit (not shown). Circuit 16 has a first power supply voltage terminal for receiving a power supply voltage labeled "VN", a second power supply voltage terminal for receiving a power supply voltage labeled "VSS", and a plurality of bidirectional terminals for coupling circuit 16 to another circuit (not shown).

Each of the circuits 12, 14, through 16 belong to a "voltage tier", where a voltage tier is determined by where it is positioned relative to other voltage tiers in the power supply voltage VDD. For example, the voltage tier of circuit 12 is a difference between VDD and voltage V1. The voltage tier of circuit 14 is a difference between V1 and V2 and the voltage tier of circuit 16 is voltage VN minus VSS.

Charge pump and regulator 18 has a first power supply voltage terminal for receiving power supply voltage VDD, and a second power supply voltage terminal for receiving power supply voltage V1. Charge pump and regulator 20 has a first power supply voltage terminal for receiving power supply voltage V1, and a second power supply voltage terminal for receiving power supply voltage V2. Charge pump and regulator 22 has a first power supply voltage terminal for receiving power supply voltage VN, and a second power supply voltage terminal for receiving VSS. A current labeled "I1" can be either sourced by charge pump and regulator 18, or sinked by charge pump and regulator 20. A current labeled "I2" can be either sourced by charge pump and regulator 20, or sinked by a charge pump and regulator circuit coupled to power supply voltage terminal V2 but not shown. A current labeled "$I_N$" can be either sourced by a charge pump and regulator that is not shown, or sinked by charge pump and regulator 22.

In one embodiment, circuits 12, 14, and 16 are implemented as CMOS (complementary metal-oxide semiconductor) logic circuits. In another embodiment, the circuit portions may be a different kind of logic circuit, or an analog circuit. Also, in one embodiment, power supply voltage VDD is a positive power supply voltage, such as for example, 2.7 volts, and VSS is at ground potential. In another embodiment, VDD may be at ground potential while VSS is a negative power supply voltage. Generally, circuit 12 has as its power supply voltage, a voltage difference between VDD and V1 (first voltage tier). Likewise, circuit 14 has a power supply voltage that is the voltage difference between V1 and V2 (second voltage tier). Also, circuit 16 has a power supply voltage that is the voltage difference between VN and VSS (nth voltage tier).

Ideally, the power supply voltages used by each of circuits 12, 14, and 16 are substantially equal. Also, a current into the VDD power supply voltage terminal labeled "$I_{IN}$" is equal to a current at the VSS power supply voltage terminal. However, circuit differences, or imbalances, may cause one of the circuit portions to use more current than another one of the circuit portions. Charge pump and regulator circuits 18, 20, and 22 are used to pump a current that corrects, or compensates, for the imbalance in currents. Because the charge pump only has to provide a difference current, a relatively poor charge pump efficiency only applies to the difference current and therefore minimally impacts the power consumption. In one example, charge pump and regulator 18 supplies current to circuit 14 if current supplied by circuit 12 at the power supply node V1 is less than a minimum current requirement of circuit 14. Also, charge pump and regulator 20 passes current from voltage node V1 through circuit 14 to the voltage node V2 if the current supplied by circuit 12 to voltage node V1 exceeds a maximum current requirement of circuit 14. Charge pump and regulator 18 determines if the minimum current requirement is met by detecting a voltage on voltage node V1. Also, charge pump and regulator 20 may determine if the maximum current requirement is met by detecting the voltage on the node V1. Likewise, charge pump and regulator 20 supplies current to circuit 16 (if there were only three circuits 12, 14, and 16 in an embodiment) if the current supplied by circuit 14 at node V2 is less than a minimum current requirement of circuit 16. Charge pump and regulator 22 passes current from node VN through charge pump and regulator 22 to VSS if the current supplied by circuit 14 to node VN (or V2) exceeds a maximum current requirement of circuit 16.

Figure 2:
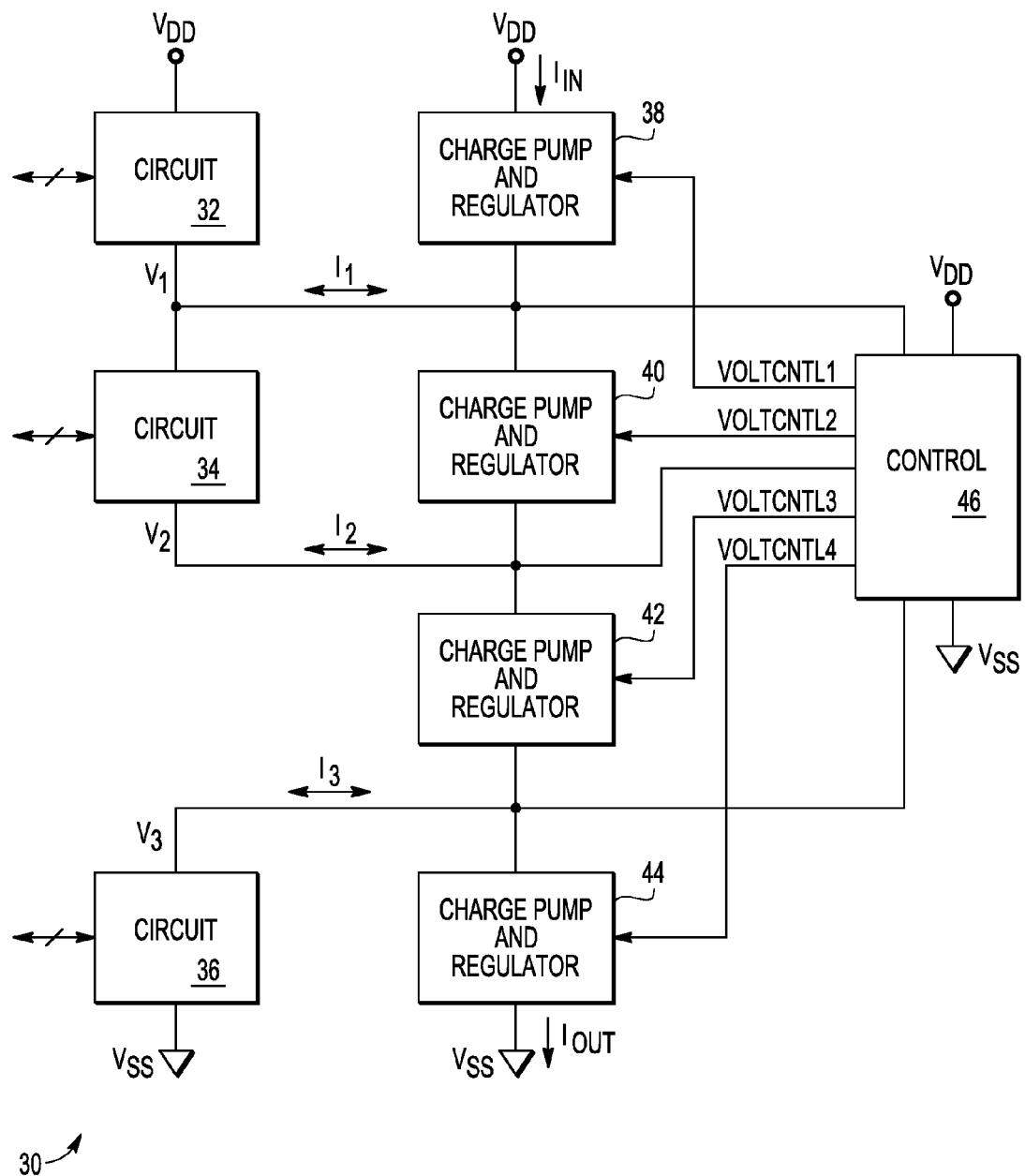
FIG. 2 illustrates, in block diagram form, a system in accordance with another embodiment.

FIG. 2 illustrates, in block diagram form, a system 30 in accordance with another embodiment. System 30 includes circuits 32, 34, and 36, charge pump and regulator circuit 38, 40, 42, and 44, and control circuit 46. Circuits 32, 34, and 36 can include any type of circuit, such as data processing, digital signal processing (DSP), memory, or the like. For example, circuits 12, 14, and 16 can be digital logic circuits, analog circuits, or a combination of digital and analog circuits. Circuit 32 has a first power supply voltage terminal for receiving a power supply voltage labeled "VDD", and a second power supply voltage terminal for receiving a power supply voltage labeled "V1". Circuit 34 has a first power supply voltage terminal for receiving power supply voltage V1, and a second power supply voltage terminal for receiving a power supply voltage labeled "V2". Circuit 36 has a first power supply voltage terminal coupled to receive a power supply voltage labeled "V3", and a second power supply voltage terminal for receiving power supply voltage VSS. Each of circuits 32, 34, and 36 has a plurality of bi-directional terminals for communicating with other circuits (not shown).

Charge pump and regulator 38 has a first power supply terminal coupled to VDD, a second power supply voltage terminal coupled to V1 for sinking and/or sourcing a current labeled "I2", and an input terminal for receiving a control signal labeled "VOLTCNTL 1". Charge pump and regulator 40 has a first power supply voltage terminal coupled to V1, a second power supply voltage terminal coupled to V2 for sinking and/or sourcing a current labeled "I2", and an input terminal for receiving a control signal labeled "VOLTCNTL 2". Charge pump and regulator 42 has a first power supply voltage terminal coupled to V2, a second power supply voltage terminal coupled to V3, and an input terminal for receiving control signal VOLTCNTL 3. Charge pump and regulator 44 has a first power supply voltage terminal coupled to V3 for sinking and/or sourcing a current labeled "I3", a second power supply voltage terminal coupled to VSS, and an input terminal couple to receive control signal VOLTCNTL 4. Control circuit 46 has a first power supply voltage terminal coupled to receive power supply voltage VDD, a second power supply voltage terminal coupled to VSS, and output terminals for providing voltage control signals VOLTCNTL 1-VOLTCNTL 4. Note that the embodiment of FIG. 2 includes three circuits and four charge pump and regulator circuits for illustration purposes only. In other embodiments there can be any number of circuits, and corresponding charge pump and regulator circuits.

The full rail power supply voltage of system 30 is VDD, where VSS is coupled to ground. Circuit 32 receives a power supply voltage equal to VDD minus V1, where VDD minus V1 establishes a first voltage tier. Likewise, circuit 34 receives a power supply voltage equal to V1 minus V2 (second voltage tier), and circuit 36 receives a power supply voltage equal to V3 minus VSS (third voltage tier). In one embodiment, the voltage tiers by each of circuits 32, 34, and 36 may be intended to be substantially equal. However, circuit imbalances may cause one of the circuits to use more current than the other circuits. In the embodiment of FIG. 2 each of the voltage tiers can be set independently of the other tiers. Charge pump and regulator circuits 38, 40, 42, and 44 can be used to source or sink a difference current as described above in the discussion of FIG. 1. In addition, control circuit 46 is used to control the voltage drop across each of circuits 32, 34, and 36. In the event the supply voltage dropped by all of the circuits 32, 34, and 36 is not equal to VDD, then charge pump and regulator 42 is used to make up the difference.

Figure 3:
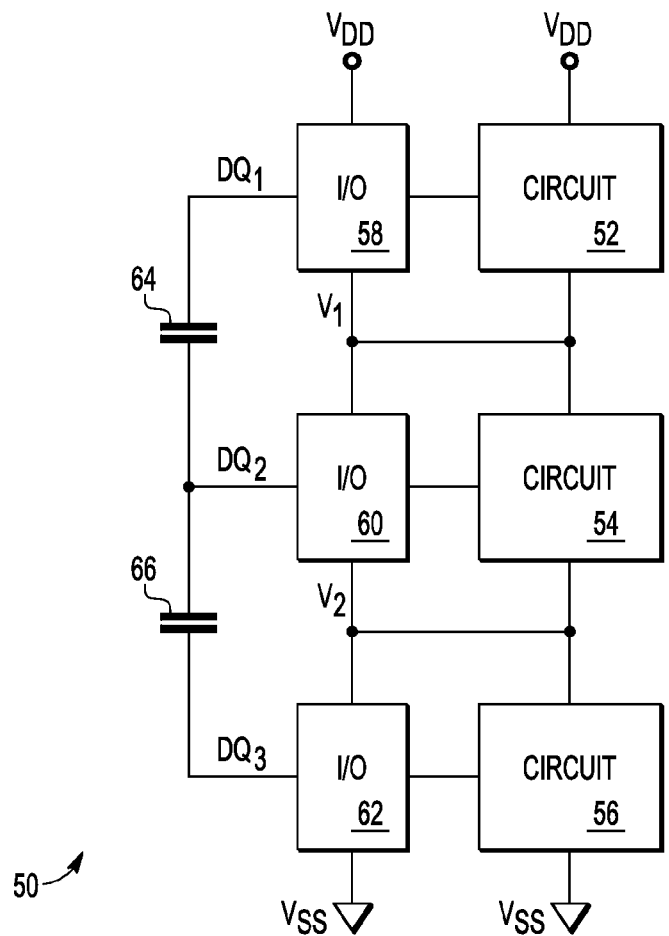
FIG. 3 illustrates, in block diagram form, a system in accordance with another embodiment.

FIG. 3 illustrates, in block diagram form, a system 50 in accordance with another embodiment. System 50 includes circuits 52, 54, and 56, input/output (I/O) circuits 58, 60, and 62, and capacitors 64 and 66. Circuit 52 has a first power supply voltage terminal coupled to receive power supply voltage VDD, an I/O terminal, and a second power supply voltage terminal coupled to receive voltage V1. Circuit 54 has a first power supply terminal coupled to V1, an I/O terminal, and a second power supply terminal coupled to voltage V2. Circuit 56 has a first power supply terminal coupled to voltage V2, an I/O terminal, and a second power supply terminal coupled to VSS. I/O circuit 58 has a first power supply voltage terminal coupled to VDD, a first I/O terminal for providing or receiving data signal DQ1, a second I/O terminal coupled to the I/O terminal of circuit 52, and a second power supply terminal coupled to V1. I/O circuit 60 has a first power supply voltage terminal coupled to V1, a first I/O terminal for providing or receiving data signal DQ2, a second I/O terminal coupled to the I/O terminal of circuit 54, and a second power supply terminal coupled to V2. I/O circuit 62 has a first power supply voltage terminal coupled to V2, a first I/O terminal for providing or receiving data signal DQ3, a second I/O terminal coupled to the I/O terminal of circuit 56, and a second power supply terminal coupled to VSS. Capacitor 64 has a first plate electrode coupled to the first I/O terminal of I/O circuit 58, and a second plate electrode coupled to the first I/O terminal of I/O circuit 54. Capacitor 66 has a first plate electrode coupled to the first I/O terminal of I/O circuit 60, and a second plate electrode coupled to the first I/O terminal of I/O circuit 62. Note that system 50 includes two series-connected capacitors for illustration purposes only. Other embodiments may include more than two series-connected capacitors. Also, note that the described embodiment includes bi-directional I/O terminals. In other embodiments, the I/O terminals may be implemented as separate input and output terminals.

Circuit 52 includes circuitry for precharging the first plate electrode of capacitor 64 to a first voltage during a precharge phase. The first voltage is between a voltage present on power supply terminal VDD and power supply terminal V1 of circuit 52. Circuit 54 includes circuitry for precharging the second plate electrode of capacitor 64 and the first plate electrode of capacitor 66 to a second voltage during the precharge phase. The second voltage is between a voltage present on the power supply terminal V1 and power supply terminal V2 of circuit 54. Circuit 56 includes circuitry for precharging the second plate electrode of capacitor 66 to a third voltage during the precharge phase. The third voltage is between a voltage present on power supply terminal V2 and the power supply terminal VSS of circuit 56. Circuit 52, when selected to provide an output signal, will provide an output signal DQ1 on its I/O terminal during a data phase following the precharge phase. Circuit 54, when circuit 52 selected to provide an output and circuit 54 is selected to receive an input signal DQ2, will interpret a voltage present on the second plate electrode of capacitor 64 in response to circuit 52 providing the output signal DQ1 to determine a logic state of the output signal DQ1. Circuit 56, when circuit 52 is selected to provide output DQ1 and circuit 56 is selected to receive an input DQ3, will interpret a voltage present on the second plate electrode of capacitor 66 in response to circuit 52 providing output signal DQ1 to determine the logic state of output signal DQ1. Further, there can be any number of circuits and capacitors. For example, there may be a fourth circuit (not shown in FIG. 3) having a first power supply terminal coupled to the second power supply terminal of circuit 56, a second power supply terminal coupled to VSS, and an input/output terminal coupled to an additional capacitor. The additional capacitor having a first plate electrode coupled to the second plate electrode of capacitor 66 and a second plate electrode coupled to the input/output of the fourth circuit. The fourth circuit may also include circuitry for precharging the second plate electrode of the third capacitor to a fourth voltage during a precharge phase. The fourth voltage would be a fraction of the power supply voltage between rails VDD and VSS, the magnitude of the power supply voltage would depend on the number of voltage tiers in the system. The fourth circuit would communicate with circuits of the other voltage tiers as described above.

System 50 of FIG. 3 may also include charge pump and regulator circuits as described above for FIG. 1 and FIG. 2. For example, there may be a first charge pump having an input coupled to the V1 terminal of circuit 52, a second charge pump having an input coupled to the V1 terminal and the V2 terminal, and a third charge pump having an input coupled to the V2 terminal. The third charge pump can pass current from the first power supply terminal of circuit 56 to the second supply terminal of circuit 56 if a current supplied by circuit 54 to the second power supply terminal of circuit 54 exceeds a maximum current requirement of circuit 56.

Figure 4:
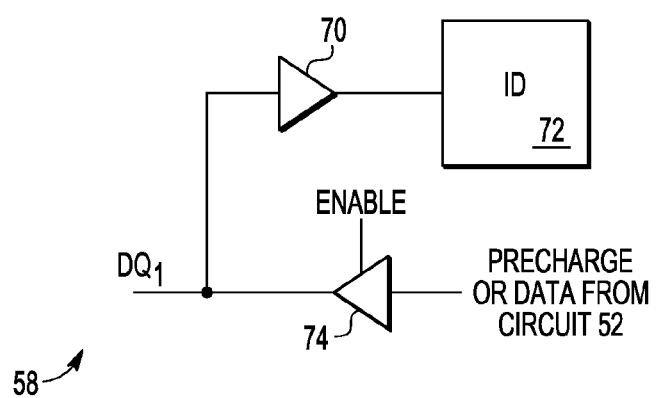
FIG. 4 illustrates, in block diagram form, an input/output (I/O) circuit if the circuit of FIG. 3.

Series-connected capacitors 64 and 66 and I/O circuits 58, 60, and 62 provide for communication between circuits of multiple voltage tiers, such as circuits 52, 54, and 56. The series-connected capacitors are first precharged to a predetermined voltage. The precharge voltage can be provided by circuit 52 as illustrated in FIG. 4, or may be generated within any of I/O circuits such as I/O circuit 58. The precharge voltage causes charge to accumulate on the capacitors. Each of the series-connected capacitors will be charged to substantially the same voltage. Then, one of the I/O circuits provides a data bit in the form of a voltage level to the series of capacitors. The data bit can be provided by buffer 74 as illustrated, or by another buffer (not shown). The data bit causes the voltage stored on each of capacitors 64 and 66 to increase or decrease by the same amount, thereby translating the data bit to each of the different voltage tiers simultaneously. For example, if the data bit is higher than the precharge voltage, the voltage level of the capacitors is increased and a logical one may be transmitted. If the data is lower than the precharge voltage, the voltage level on the capacitors is lowered and a logic zero may be transmitted.

FIG. 4 illustrates, in block diagram form, input/output (I/O) circuit 58 if system 50 of FIG. 3. I/O circuit 58 includes buffers 70 and 74, and identity recognition circuit 72. Buffer 70 has an input terminal for receiving signal DQ1, and an output terminal. Buffer 74 has an input terminal coupled to receive either a precharge signal or a data signal from circuit 52, an output terminal for providing signal DQ1, and a control terminal for receiving enable signal ENABLE. Identity recognition circuit 72 has an input terminal coupled to the output terminal of buffer 70. Identity recognition circuit 72 is used to determine the intended recipient of a signal transmitted to capacitors 64 and 66. For example, an output signal DQ1 might include a recognition portion directing the DQ1 signal to only I/O circuit 62. I/O circuit 60 would then ignore the DQ1 signal after processing a recognition portion of the DQ1 signal.

Note that the charge pump and regulator circuits of FIGS. 1 and 2 can also be used with the system 50 of FIG. 3.

By translating the data bit using the series of capacitors, level shifters are not required. Also, translating using the series of capacitors is much faster than traditional level shifters because a traditional level shifter generally can only level shift between adjacent voltage tiers. To level shift a signal between multiple voltage tiers requires a level shifter between each tier and the level shifting between tiers must be done serially.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing system, this exemplary system is presented merely to provide a useful reference in discussing various aspects of the embodiment. Of course, the description of the system has been simplified for purposes of discussion, and it is just one of many different types of appropriate systems that may be used. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the systems depicted herein are merely exemplary, and that in fact many other systems can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system coupled between a positive power supply terminal and a negative power supply terminal, wherein a full rail power supply voltage of the system is a voltage difference between a first power supply voltage at the positive power supply terminal and a second power supply voltage at the negative power supply terminal, the system comprising:
a first circuit having a first power supply terminal coupled to the positive power supply terminal and a second power supply terminal;
a first charge pump and regulator having an input coupled to the positive power supply terminal and an output coupled to the second power supply terminal of the first circuit;
a second circuit having a first power supply terminal coupled to the second power supply terminal of the first circuit and a second power supply terminal;
a second charge pump and regulator having an input coupled to the first power supply terminal of the second circuit and an output coupled to the second power supply terminal of the second circuit, wherein the first charge pump and regulator controls a first voltage drop across the first circuit and the second charge pump and regulator controls a second voltage drop across the second circuit independently of the first charge pump and regulator, and wherein the first charge pump and regulator determines if a minimum current requirement of the second circuit is met by detecting a voltage on the second power supply terminal of the first circuit;
a third charge pump and regulator having an input and an output; and
a control circuit to control voltage drops across the first circuit and the second circuit, and when a voltage dropped by circuits of the system coupled between the positive power supply terminal and the negative power supply terminal is not equal to the full rail power supply voltage, the third charge pump and regulator is controlled to make up a difference between the full rail power supply voltage and the voltage dropped by the circuits of the system.

2. The system of claim 1, wherein the first circuit and the second circuit include a data processing core.

3. The system of claim 1, wherein:
the first charge pump and regulator supplies current to the second circuit if a current supplied by the first circuit at the second power supply terminal of the first circuit is less than a minimum current requirement of the second circuit.

4. The system of claim 1, further comprising:
the second charge pump and regulator passes current from the first power supply terminal of the second circuit to the second supply terminal of the second circuit if a current supplied by the first circuit to the second power supply terminal of the first circuit exceeds a maximum current requirement of the second circuit.

5. The system of claim 1, wherein the second charge pump and regulator determines if a maximum current requirement of the second circuit is met by detecting the voltage on the second power supply terminal of the first circuit.

6. The system of claim 1, further comprising:
a third circuit having a first power supply terminal coupled to the output of the third charge pump and regulator; and
a fourth charge pump and regulator having an input coupled to the first power supply terminal of the third circuit and an output coupled to the negative power supply terminal.

7. The system of claim 6, wherein:
the fourth charge pump and regulator supplies current to the third circuit if a current supplied at the first power supply terminal of the third circuit is less than a minimum current requirement of the third circuit.

8. The system of claim 6, wherein:
the fourth charge pump and regulator passes current from the first power supply terminal of the third circuit to the negative power supply terminal if a current supplied to the first power supply terminal of the third circuit exceeds a maximum current requirement of the third circuit.

9. The system of claim 1, wherein:
the first charge pump and regulator and the second charge pump and regulator function to provide a required current to the second current and divert excess current from the first circuit away from the second circuit.

10. A method of operating a system coupled between a positive power supply terminal and a negative power supply terminal, wherein a full rail power supply voltage of the system is a voltage difference between a first power supply voltage at the positive power supply terminal and a second power supply voltage at the negative power supply terminal, and wherein the system has a first circuit having a first power supply terminal coupled to the positive power supply terminal and a second power supply terminal and a second circuit having a first power supply terminal coupled to the second power supply terminal of the first circuit and a second power supply terminal, comprising:
operating the first circuit to cause a first current to pass from the first terminal of the first circuit to the second terminal of the first circuit;
determining if the first current exceeds a maximum current requirement of the second circuit or if the first current is less than a minimum current requirement of the second circuit;
if the first current exceeds the maximum current requirement of the second circuit, using a first charge pump and regulator coupled between the first and second power supply terminals of the second circuit to divert a sufficient portion of the first current away from the second circuit so that a remaining portion of the first current does not exceed the maximum current requirement of the second circuit;
if the first current is less than the minimum current requirement of the second circuit, using a second charge pump and regulator coupled between the first and second power supply terminals of the first circuit to provide an additional current to the first current so that a sum of the first current and the additional current is not less than the minimum current requirement of the second circuit, wherein the first charge pump and regulator operates independently of the second charge pump and regulator; and
if a voltage dropped by circuits of the system coupled between the positive power supply terminal and the negative power supply terminal is not equal to the full rail power supply voltage, using a third charge pump and regulator to make up a difference between the full rail power supply voltage and the voltage dropped by the circuits of the system.

11. The method of claim 10, wherein the step of determining comprises detecting a voltage between the first and second power supply terminals of the first circuit.

12. A system, comprising:
a plurality of circuits having power supply terminals coupled between a positive power supply terminal and a negative power supply terminal, wherein a full rail power supply voltage of the system is a voltage difference between a first power supply voltage at the positive power supply terminal and a second power supply voltage at the negative power supply terminal;
a plurality of charge pump and regulator circuits coupled to the power supply terminals of the plurality of circuits; wherein:
each circuit of the plurality of circuits has a first power supply terminal and a second power supply terminal;
each charge pump and regulator circuit of the plurality of charge pump and regulator circuits corresponds to a circuit of the plurality of circuits and has its input coupled to the first power supply terminal of the circuit to which it corresponds and an output coupled to the second power supply terminal of the circuit to which it corresponds, wherein each of the plurality of charge pump and regulator circuits operates independently of the other charge pump and regulator circuits, and wherein each charge pump and regulator circuit provides additional current to a circuit of the plurality of circuits if the charge pump determines that the current received by the first power supply terminal of the circuit to which its output is coupled is less than a minimum current requirement of the circuit to which its output is coupled;
an additional charge pump and regulator circuit having an input and an output; and
a control circuit to control voltage drops across the plurality of circuits, and when a total voltage dropped by the plurality of circuits is not equal to the full rail power supply voltage, the additional charge pump and regulator circuit is controlled to make up a difference between the full rail power supply voltage and the total voltage dropped by the plurality of circuits.

13. The system of claim 12, wherein:
each charge pump and regulator circuit diverts current away from the circuit to which it corresponds if the current present on its input exceeds a maximum current requirement of the circuit to which it corresponds.

* * * * *